(No Model.)

W. A. TURNER.
BALL COCK VALVE.

No. 521,350. Patented June 12, 1894.

Witnesses
Chas. F. Schmelz.
Rufus B. Fowler.

William A. Turner Inventor

UNITED STATES PATENT OFFICE.

WILLIAM A. TURNER, OF WORCESTER, MASSACHUSETTS, ASSIGNOR TO EDMUND CONVERSE, OF SAME PLACE.

BALL-COCK VALVE.

SPECIFICATION forming part of Letters Patent No. 521,350, dated June 12, 1894.

Application filed October 18, 1889. Serial No. 327,469. (No model.)

*To all whom it may concern:*

Be it known that I, WILLIAM A. TURNER, a citizen of the United States, residing at Worcester, in the county of Worcester and State of Massachusetts, have invented a new and useful Improvement in Ball-Cock Valves, of which the following is a specification, accompanied by drawings forming a part of the same and representing a ball-cock valve embodying my invention, and in which—

Figure 1:
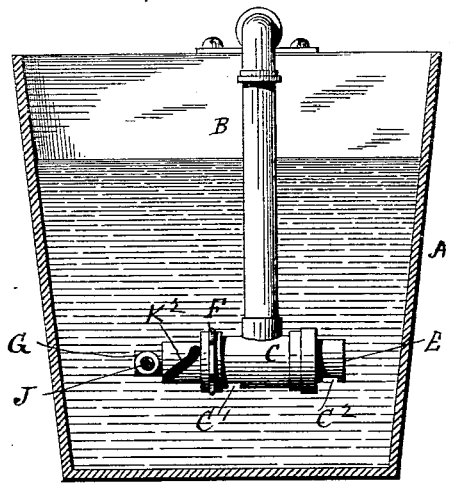
Figure 2:
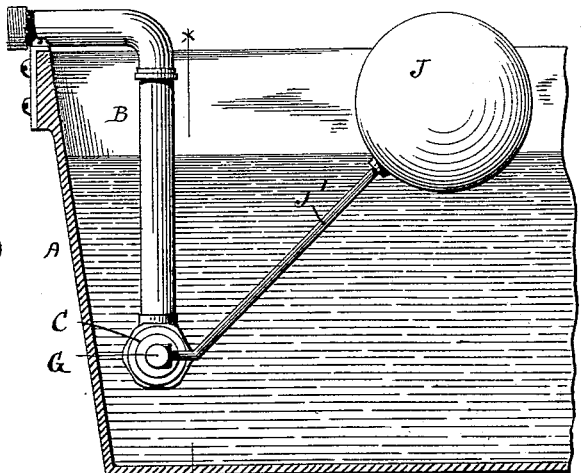
Figure 6:
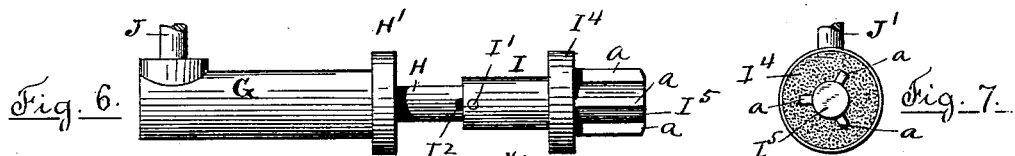
Figure 7:
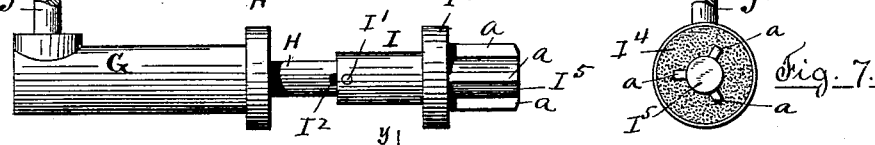
Figure 3:
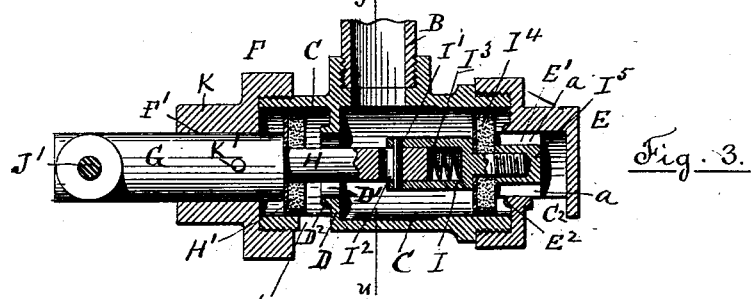
Figure 4:
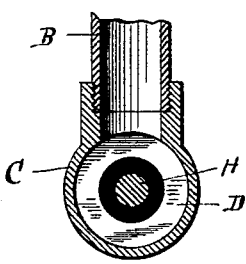
Figure 5:
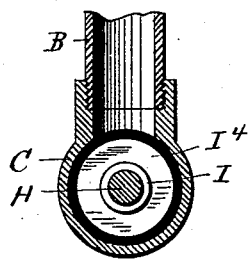

Figure 1 represents a transverse sectional view of a flushing tank containing my improved ball cock valve, which is shown in front view, the ball having been removed on line X, X, Fig. 2. Fig. 2 represents a longitudinal sectional view of the flushing tank showing the inclosed ball cock valve in end view. Fig. 3 represents a central longitudinal sectional view of the valve chamber, disclosing the valve disks and their seats. Figs. 4 and 5 show vertical sectional views on line Y, Y, Fig. 3, but looking in opposite directions. Fig. 6 represents a detached view of the valve stem, and Fig. 7 shows an end view of the same.

Similar letters refer to similar parts in the several figures.

Referring to the drawings, A, A, denote the flushing tank; B the supply pipe upon the lower end of which is screwed the valve chamber C, consisting of a barrel placed transversely to the supply pipe B, and provided with a metallic partition D, having a central circular opening D', forming a water way and surrounded by the annular rim $D^2$, forming a valve seat. Upon one end of the valve chamber is screwed the cap E having a similar water way E' and valve seat $E^2$, and upon the opposite end of the valve chamber is screwed the cap F, provided with a concentric opening F' forming the bearing for the sliding spindle G. The valve stem is made in two sections; the section H is attached to the spindle G and carries an attached valve disk H'; the section I is hollow and slides upon the end of the section H and is connected with the section H by means of the pin I' passing through a slot $I^2$ in the end of section H of the valve stem. A spiral spring $I^3$ is preferably inserted within the hollow section I, with one end bearing against the end of section H, the tension of the spring serving to force the sections H and I apart. A valve disk $I^4$ is attached to section I and is held in place by the nut $I^5$, which is provided with the wings $a$, $a$, $a$, the edges of which bear against the wall of the water way E', forming a sliding bearing for the free end of the section I of the valve stem.

J denotes the hollow ball attached to the free end of the lever J', which is attached radially to the end of the spindle G, by which a rotary motion movement is imparted to the spindle G and valve stem as the ball J is raised or lowered by the variation of the water line in the flushing tank. The hub K of the cap F is provided with a cam slot K' to receive the stud $K^2$ projecting radially from the spindle G, causing the spindle G to move longitudinally as it is rotated by the angular motion of the lever J'.

The operation of the valve is as follows: As the water is drawn from the tank A, the lever J' falls rotating the spindle G and by the action of the stud $K^2$ in the cam slot K' drawing the spindle G toward the left, Fig. 3, withdrawing the valve disks H' and $I^4$ from their valve seats $D^2$ and $E^2$, allowing the water flowing into the valve chamber C through the supply pipe B to escape through the water way D' and opening C' into the tank A, and also in the opposite direction through the water way E' and opening $C^2$ into the tank A. As the tank fills with water the ball J is raised, rotating the spindle G, by the action of the stud $K^2$ in the cam slot K', and imparting an endwise movement to the spindle G toward the left, Fig. 3, carrying the valve disks against their valve seats and checking the escape of water from the valve chamber into the tank A. As the spindle G is carried toward the left as described in the operation of closing the valves, the valve disk $I^4$ is first brought against the seat $E^2$ closing the water way E' to the passage of water from the valve chamber C; the continued rotation of the spindle G will continue the endwise movement of the spindle toward the left, causing the section H of the valve stem to slide within the hollow section I, compressing the spring $I^3$, until the valve disk H' is brought against the valve seat $D^2$ thereby closing the water way D' to the passage of water from the valve chamber C. During the reverse movement of the ball lever J' the spindle G is moved toward the left, Fig. 3, and the valve disk H' is first removed from contact with its seat, the valve disk I⁴ being held against its seat by the tension of the spring I³, until by the continued movement of the spindle G and section H the end wall of the slot I² is brought in contact with the pin I', when the endwise motion of the section H is communicated to the section I and the valve disk I⁴ is removed from its seat. As the water supply is admitted to the valve chamber C between the disks I⁴ and H' the pressure of the water will be exerted in one direction upon one of the valve disks and in the opposite direction upon the other the pressure upon one disk neutralizing the pressure upon the other and permitting the spindle G and connected valve stem to be moved longitudinally independently of the water pressure.

Under ordinary water pressures the pressure upon the inner side of the valve disk I⁴ will be sufficient to hold it in contact with its seat until withdrawn by the movement of its connected section H, but in case of low water pressure it is better to employ the spring I³, as described.

What I claim as my invention, and desire to secure by Letters Patent, is—

1. The combination of pipe B, communicating with a valve chamber C, a valve chamber C provided with an opening C' and having a transverse partition D provided with a water way D' and a valve seat D², cap E provided with a water way E' and valve seat E², cap F provided with a concentric opening F', spindle G sliding in said concentric opening and having a section H adapted to carry a valve disk, a valve disk H' carried on said section, a hollow section I arranged to slide upon the section H, a valve disk I⁴ carried by said section I by a screw threaded nut I⁵, nut I⁵ held upon the section I and provided with wings a, a, a, arranged to bear against the wall of the water way E', pin I' carried by the hollow section I and working in a slot I² in the section H, in order to limit the sliding motion of said hollow section, substantially as described.

2. The combination of a barrel inclosing a valve chamber and placed transversely to the water supply pipe, a supply pipe communicating with the central portion of said chamber, caps E and F applied to the ends of said barrel, partition D provided with a valve seat D², valve spindle G sliding concentrically in the cap F and having a section H, valve disk H' carried on said section H, a hollow section I sliding on said section H, valve disk carried by said hollow section, spring I³ acting to separate the sections of the valve stem, means by which the sliding motion of said hollow section is limited, a valve seat provided upon the cap E and a valve disk carried by the hollow section of the valve stem, substantially as described.

WILLIAM A. TURNER.

Witnesses:
E. CONVERSE,
RUFUS B. FOWLER.